(12) United States Patent
Patil

(10) Patent No.: US 6,358,354 B1
(45) Date of Patent: Mar. 19, 2002

(54) UV AND THERMALLY CURABLE ADHESIVE FORMULATION

(75) Inventor: Girish Shivaji Patil, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 2 days.

(21) Appl. No.: 09/610,083

(22) Filed: Jul. 5, 2000

(51) Int. Cl.[7] .................. C09J 163/02; C09J 163/04; C09J 5/00; B41J 2/135

(52) U.S. Cl. .............. 156/273.3; 156/273.5; 156/275.5; 156/275.7; 347/20; 347/47; 438/455; 522/25; 522/26; 522/31; 522/83; 522/143; 522/146; 522/167; 522/170

(58) Field of Search ............... 438/455; 156/273.5, 156/275.5, 275.7, 273.3; 347/20, 47; 522/25, 26, 31, 83, 143, 170, 146, 167

(56) References Cited

U.S. PATENT DOCUMENTS

| | | |
|---|---|---|
| 3,450,613 A | 6/1969 | Steinberg |
| 4,308,118 A | 12/1981 | Dundgeon |
| 4,412,048 A | 10/1983 | Dixon et al. |
| 4,504,374 A | 3/1985 | Lewarchik et al. |
| 4,952,342 A | 8/1990 | Drain et al. |
| 5,057,348 A | 10/1991 | Drain et al. |
| 5,242,715 A | 9/1993 | Schoen et al. |
| 5,384,339 A | 1/1995 | Starkey |
| 5,516,813 A | 5/1996 | Starkey |
| 5,717,011 A | * 2/1998 | Griggs et al. |

FOREIGN PATENT DOCUMENTS

| | | |
|---|---|---|
| EP | 445791 | 9/1991 |
| EP | 646632 | 4/1995 |
| EP | 0 646 632 A1 * | 4/1995 |
| EP | 775715 | 5/1997 |
| GB | 2177093 | 1/1987 |
| WO | WO 98/32159 * | 7/1998 |

* cited by examiner

Primary Examiner—Susan W. Berman
(74) Attorney, Agent, or Firm—D. Brent Lambert; Michael T. Sanderson; David E. LaRose

(57) ABSTRACT

The invention provides an adhesive formulation for tacking and holding a nozzle plate in alignment on a semiconductor chip for an ink jet pen of an ink jet printer. The adhesive formulation includes a multifunctional epoxy material, a difunctional epoxy material, a fumed silica viscosity control agent, an imidazole-based thermal initiator and a mixed aryl sulfonium salt photoinitiator. Use of the adhesive formulation enables a nozzle plate to be assembled to a semiconductor chip with while substantially maintaining critical alignment between the nozzle plate and semiconductor chip.

31 Claims, 2 Drawing Sheets

View 1A-1A

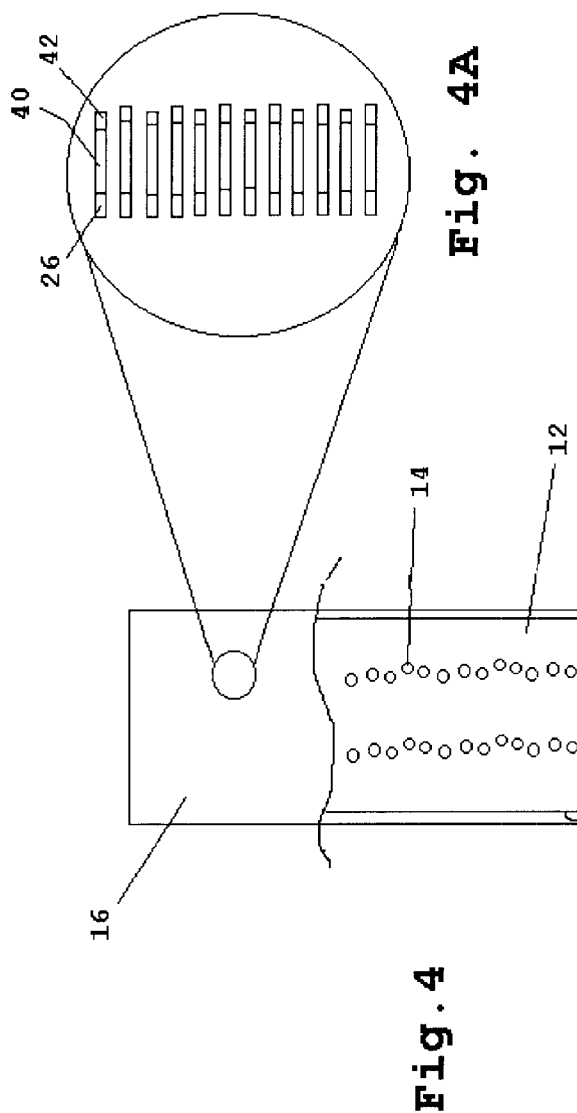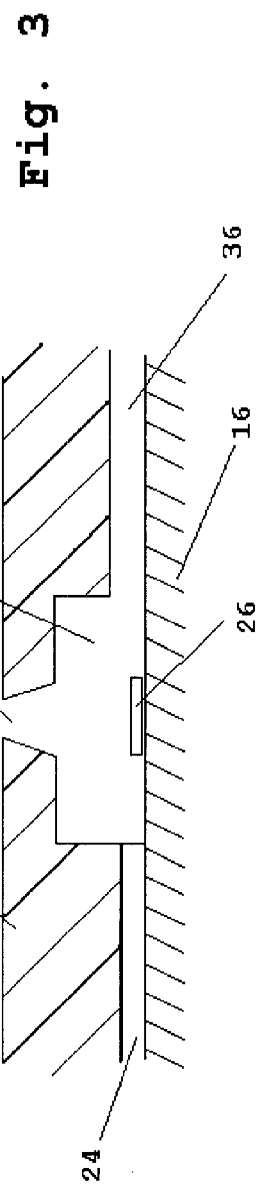

UV AND THERMALLY CURABLE ADHESIVE FORMULATION

FIELD OF THE INVENTION

The invention relates to improved adhesive formulations and to methods for attaching a semiconductor chip to a nozzle plate for an ink jet printhead.

BACKGROUND OF THE INVENTION

Ink jet printers continue to evolve as the technology for ink jet printing continues to improve to provide higher speed, higher quality printers. The improvement in speed and quality does not come without a price, however. The ink jet pens of such printers are more costly to manufacture because of tighter alignment tolerances which must be met for the operative parts of the printers. One area of increased criticality is the alignment tolerance between the nozzle plate and semiconductor chip components of the ink jet pen.

During the manufacturing process an ink jet pen, a nozzle plate is aligned to a semiconductor chip so that heater resistors used for heating the ink on the semiconductor chip align with nozzle holes on the nozzle plate. Misalignment between the heater resistors and the nozzle holes has a disadvantageous effect on the accuracy of ink droplet placement of ink ejected from the nozzle holes to the print media. Heater resistor and nozzle plate alignment also has an effect on the mass and velocity of the ink droplet ejected through the nozzle hole.

There are multiple manufacturing steps required to produce an ink jet pen. First a nozzle plate is attached to the semiconductor chip after aligning the nozzle plate and chip to one another. The TAB circuit or flexible circuit is then electrically connected to a semiconductor chip using a wire bonding or TAB bonding process. The resulting nozzle/plate chip and circuit assembly is then attached to a cartridge body in a chip pocket thereon using a die bond adhesive. Finally the TAB circuit or flexible circuit portion of the assembly is adhesively attached to the cartridge body. Because of the multiple adhesives used for making the ink jet pen, there are several curing steps required during the assembly of the pen components. With each assembly and curing step there is an opportunity for component misalignment to occur.

Despite advances made in the art manufacturing ink jet pens for ink jet printers, there remains a need for improved adhesive formulations and methods which provide alignment of the pen components as required for higher quality printers.

SUMMARY OF THE INVENTION

With regard to the foregoing and other objects, the invention provides an adhesive formulation for tacking and holding a nozzle plate in alignment on a semiconductor chip for an ink jet pen of an ink jet printer. The adhesive formulation includes a multifunctional epoxy material, a difunctional epoxy material, a fumed silica viscosity control agent, an imidazole-based thermal initiator and a mixed aryl sulfonium salt photoinitiator.

In another aspect the invention provides a method for making an ink jet pen for an ink jet printer. According to the method dots of a UV and thermally curable adhesive are applied to at least two diagonally opposed corners of a nozzle plate or semiconductor chip. The adhesive includes a multifunctional epoxy material, a difunctional epoxy material, a fumed silica viscosity control agent, an imidazole-based thermal initiator and a mixed aryl sulfonium salt photoinitiator. After applying the adhesive dots to the nozzle plate or semiconductor chip, the nozzle plate and semiconductor chip are aligned to one another to provide a nozzle plate/chip assembly. At least a portion of the adhesive dots is exposed to actinic radiation in order to cure an amount of the adhesive sufficient to substantially maintain alignment between the nozzle plate and semiconductor chip during subsequent curing and assembly steps. The nozzle plate/chip assembly is then heated to a temperature sufficient to cure any portion of the adhesive dots not cured by exposure to the actinic radiation.

In yet another aspect the invention provides a pen for an ink jet printer. The pen includes a cartridge body containing one or more printheads attached thereto. Each printhead includes a nozzle plate, a semiconductor chip attached to the nozzle plate and a flexible circuit or TAB circuit attached to the semiconductor chip. The flexible circuit or TAB circuit contains electrical traces and electrical connections from the traces to semiconductor chip. A UV and thermally curable adhesive is used for tacking the nozzle plate and the semiconductor chip to one another. The adhesive contains a multifunctional epoxy material, a difunctional epoxy material, a fumed silica viscosity control agent, an imidazole-based thermal initiator and a mixed aryl sulfonium salt photoinitiator.

An advantage of the compositions and methods according to the invention is that ink jet pens may be assembled and critical alignment between functional parts may be maintained throughout the assembly process. The adhesive formulation described herein is particularly useful for tacking and holding a nozzle plate to semiconductor chip after aligning the nozzle plate to the chip. Because of the quick cure of the UV curable portion of the adhesive, the alignment, once set, is substantially maintained throughout subsequent high temperature heating and/or pressure curing steps of the manufacturing process. The adhesive provides a useful combination of adhesive tack and viscosity in its uncured state and enables substantially complete cure of the adhesive by both UV and thermal curing methods despite the presence of areas of the nozzle plate/chip assembly which cannot be adequately cured by UV curing methods alone.

BRIEF DESCRIPTION OF THE DRAWINGS

Further advantages of the invention will become apparent by reference to the detailed description when considered in conjunction with the figures, which are not to scale, wherein like reference numbers indicate like elements through the several views, and wherein:

FIG. 3 is a cross-sectional view, not to scale of a portion of a nozzle plate chip assembly according to the invention;

FIG. 4 is a plan view of a nozzle plate and semiconductor chip assembly according to the invention; and FIG. 4A is an magnified view of a portion of a semiconductor chip of a nozzle plate/chip assembly.

DETAILED DESCRIPTION OF THE INVENTION

Figure 1:
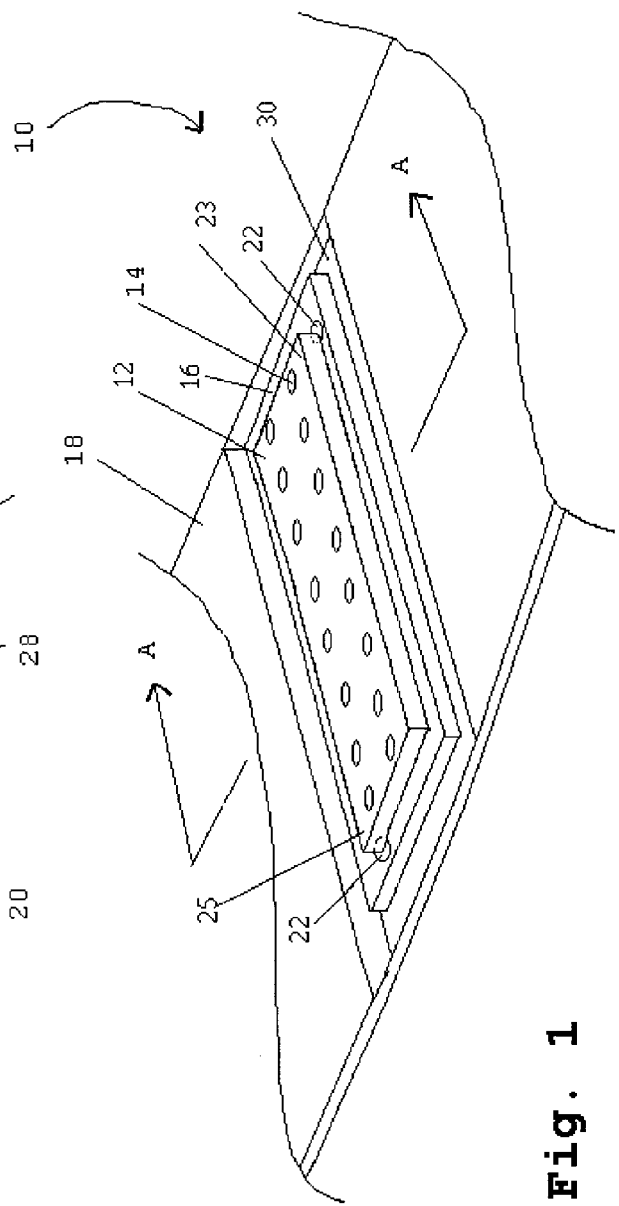
FIG. 1 is a perspective view not to scale of an assembled nozzle plate, semiconductor chip and flexible circuit or TAB circuit according to the invention.

With reference to FIG. 1, there is shown, in perspective view, a portion of an ink jet pen including one or more printheads 10 attached to a cartridge body. The printhead 10 includes a nozzle plate 12 containing nozzle holes 14. The nozzle plate 12 is adhesively attached to a semiconductor chip 16 containing heater resistors for heating ink to be ejected through nozzle holes 14. A flexible circuit or TAB circuit 18 is electrically connected to the semiconductor chip 16 to provide electrical impulses for ejecting ink from selected nozzle holes 14. Flexible circuits and TAB circuits 18 are resilient polymeric films which contain electrical traces thereon for conducting electrical signals from a source to a device connected to the traces of the flexible or TAB circuit 18. Each ink jet pen may contain a single ink jet printhead 10 for a single color ink, such as black, cyan, magenta or yellow or may contain multiple printheads 10 for multiple colors of ink.

Figure 2:
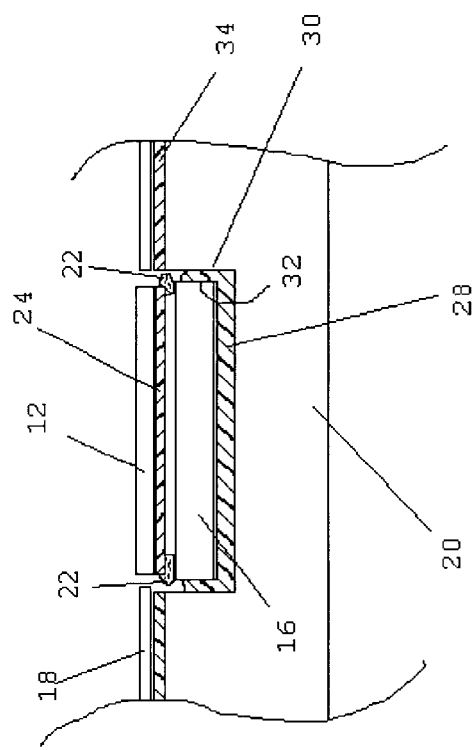
FIG. 2 is a cross-sectional view not to scale of a portion of an ink jet pen showing assembly of a nozzle plate to a semiconductor chip using an adhesive according to the invention.

A partial cross-sectional view of nozzle plate 12 and semiconductor chip 16 attached to one another and to an ink cartridge body 20 is illustrated in FIG. 2. The nozzle plate 12 is aligned with the semiconductor chip 16 so that the nozzle holes 14 are in axial alignment with corresponding heater resistors, described in more detail below with reference to FIGS. 3, 4 and 4A. The nozzle plate 12 is tacked to the semiconductor chip 16 using at least two adhesive dots 22 which are provided on at least diagonally opposed corners 23 and 25 of the nozzle plate 12 as shown in FIG. 1. It is preferred to use at least two adhesive dots 22 and preferably four adhesive dots 22 on the four corners of the nozzle plate 12 to tack the nozzle plate 12 to the semiconductor chip 16 after aligning the nozzle plate 12 to the chip 16.

The adhesive used to provide adhesive dots 22 is preferably formulated to contain a UV curable portion having a cure time when exposed to actinic radiation of less than about one second. The adhesive also contains a portion which effectively increases the cross-link density of the adhesive which may be cured over a longer period of time by heat and/or pressure. The adhesive dots 22 are preferably applied to the nozzle plate 12 or semiconductor chip 16 in a pattern which does not interfere with the flow features of the nozzle plate which are described in more detail below. Once cured, adhesive dots 22 preferably have a thickness ranging from about 20 to about 40 microns and a diameter ranging from about 200 to about 400 microns.

The nozzle plate 12 and semiconductor chip 16 are preferably aligned optically so that the nozzle holes 14 in the nozzle plate 12 align with heater resistors 26 on the semiconductor chip 16 as illustrated in FIG. 3. Misalignment between the nozzle holes 14 and the heater resistor 26 may cause problems such as misdirection of ink droplets from the printhead 10, inadequate droplet volume or insufficient droplet velocity. Accordingly, nozzle plate/chip assembly 12/16 alignment is critical to the proper functioning of an ink jet pen.

As the nozzle plate 12 and semiconductor chip 16 are aligned they are tacked to one another using adhesive dots 22. A portion of the adhesive dots 22 not shielded by the nozzle plate 12 is preferably exposed to actinic radiation to quickly cure and hold the nozzle plate 12 and semiconductor chip 16 in alignment. Suitable actinic radiation includes visible light, ultraviolet light, electron beam, x-ray, gamma-ray, beta-ray and the like. A preferred actinic radiation for partially curing adhesive dots 22 is UV radiation having a wavelength in the range of from about 200 to about 400 nanometers. The adhesive dots 22 are preferably exposed to ultraviolet radiation for a period of time ranging from about 0.5 to about 20 seconds. Because a portion of the adhesive dots 22 is cured immediately, there is less tendency for the nozzle plate 12 and chip 16 to become misaligned during subsequent assembly and curing steps for making the ink jet printhead 10. The adhesive dots 22 may be applied to the nozzle plate 12 or semiconductor chip 16 using a needle-like adhesive dot placement device or any other method known to those of skill in the art.

The nozzle plate 12 is also bonded to the semiconductor chip 16 by use of an adhesive layer 24 (FIGS. 2 and 3). The adhesive layer 24 may be a heat curable adhesive such a B-stageable thermal cure resin, including, but not limited to phenolic resins, resorcinol resins, epoxy resins, ethylene-urea resins, furane, resins, polyurethane resins and silicone resins. The adhesive layer 24 is preferably cured before attaching the chip 16 to the cartridge body 20 and the adhesive layer 24 preferably has a thickness ranging from about 1 to about 25 microns. The adhesive layer 24 is preferably a phenolic butyral adhesive which is cured by heat and pressure once the nozzle plate 12 is aligned and tacked to the semiconductor chip 16 using adhesive dots 22.

Once the nozzle plate 12 and semiconductor chip 16 are fixedly attached to one another and the adhesive dots 22 exposed to actinic radiation sufficient to cure at least a portion of the adhesive in dots 22, heat and pressure are applied to the nozzle plate/chip assembly 12/16 to cure adhesive 24. During the thermal curing cycle for adhesive layer 24, adhesive dots 22 are preferably exposed to a temperature in excess of about 80° C., most preferably a temperature in the range of from about 80 to about 120° C. for a period of time ranging from about 15 minutes to about 2 hours to thermally cure any portion of the adhesive dots 22 not cured by actinic radiation. Curing of adhesive layer 24 also completes the cure of adhesive dots 22 since only a portion of the adhesive dots 22 are exposed to actinic radiation as shown in FIGS. 1 and 2.

After attaching the nozzle plate 12 to the chip 16, the semiconductor chip 16 of the nozzle plate/chip assembly 12/16 is electrically connected to the flexible circuit or TAB circuit 18. Subsequent to curing adhesive 24, the nozzle plate/chip assembly 12/16 is attached to the cartridge body 20 using a die bond adhesive 28. The nozzle plate/chip assembly 12/16 is preferably attached to the cartridge body 20 in a chip pocket 30. Adhesive 28 seals around the edges 32 of the semiconductor chip 16 to provide a substantially liquid tight seal to inhibit ink from flowing between the chip 16 and the chip pocket 30.

The die bond adhesive 28 used to attached the nozzle plate/chip assembly 12/16 to the cartridge body 20 is preferably an epoxy adhesive such as a die bond adhesive available from Emerson & Cuming of Monroe Township, N.J. under the trade name ECCOBOND 3193-17. In the case of a thermally conductive cartridge body 20, the die bond adhesive 28 is preferably a resin filled with thermal conductivity enhancers such as silver or boron nitride. A preferred thermally conductive die bond adhesive 28 is POLY-SOLDER LT available from Alpha Metals of Cranston, R.I. A suitable die bond adhesive 28 containing boron nitride fillers is available from Bryte Technologies of San Jose, Calif. under the trade designation G0063. The thickness of adhesive 28 preferably ranges from about 25 microns to about 125 microns. Heat is typically required to cure adhesive 28 and fixedly attach the nozzle plate/chip assembly 12/16 to the cartridge body 20.

An important aspect of the invention is the use of an adhesive for adhesive dots 22 which is preferably a mixture of a multifunctional epoxy material and a difunctional epoxy material. In addition to the epoxy materials, the mixture also preferably contains a mixed aryl sulfonium salt photoinitiator, an imidazole-based thermal initiator and a fumed silica viscosity control agent. Such an adhesive is preferably curable by actinic radiation and thermally. It is also particularly preferred that the cured adhesive exhibit chemical resistance to inks of the type used in the ink jet pen. Such inks include pigment-based and dye-based inks. Suitable dye-based inks are described, for example, in U.S. Pat. No. 5,364,461 to Beach et al. and U.S. Pat. No. 5,981,623 to McCain et al. Pigment-based inks are described, for example, in U.S. Pat. No. 5,925,692 to Kappele et al.

The multifunctional epoxy material component of the adhesive for adhesive dots 22 may be selected from aromatic epoxides such as glycidyl ethers of di- and poly-phenols. A particularly preferred multifunctional epoxy resin is a polyglycidyl ether of phenolformaldeyhyde novolac resin such as the novolac epoxy resin having an epoxide equivalent weight ranging from about 172 to about 179 and a viscosity at 25° C. ranging from about 3,000 to about 5,000 centipoise which is available from Dow Chemical Company of Midland, Mich. under the trade name D.E.N. 431. The amount of multifunctioner epoxy resin in the adhesive formulation preferably ranges from about 15 to about 35 percent by weight of the formulation, most preferably from about 20 to about 25 percent by weight of the total formulation weight.

The difunctional epoxy material component of the adhesive formulation for adhesive dots 22 is preferably selected from difunctional epoxy compounds which include diglycidyl ethers of bisphenol-A (e.g. those available under the trade designations "EPON 828", "EPON 1004", "EPON 1001F", "EPON SU-8" and "EPON 1010", available from Shell Chemical Company of Houston, Tex., "DER-331", "DER-332", and "DER-334", available from Dow Chemical Company of Midland, Mich., 3,4-epoxycyclohexylmethyl-3,4-epoxycyclo-hexene carboxylate (e.g. "ERL-4221" available from Union Carbide Corporation of Danbury, Conn., 3,4-epoxy-6-methylcyclohexylmethyl-3,4-epoxy-6-methylcyclohexene carboxylate (e.g. "ERL-4201" available from Union Carbide Corporation), bis(3,4-epoxy-6-methylcyclohexylmethyl) adipate (e.g. "ERL-4289" available from Union Carbide Corporation), and bis(2,3-epoxycyclopentyl) ether (e.g. "ERL-0400" available from Union Carbide Corporation.

A particularly preferred difunctional epoxy resin is a bisphenol-A/epichlorohydrin epoxy resin available from Shell Chemical Company of Houston, Tex. under the trade name EPON resin 828. The amount of difunctional epoxy resin in the formulation preferably ranges from about 40 to about 80 percent by weight of the formulation, most preferably from about 60 to about 65 percent by weight of the formulation.

As set forth above, the adhesive for adhesive dots 22 also preferably contains a photoinitiator, a thermal initiator and a viscosity control agent. The photoinitiator is preferably a compound or mixture of compounds capable of generating a cation such as an aromatic complex salt which may be selected from onium salts of a Group VA element, onium salts of a Group VIA element, and aromatic halonium salts. Aromatic complex salts, upon being exposed to ultraviolet radiation or electron beam irradiation, are capable of generating moieties which initiate reactions with epoxides. The aromatic complex salt is preferably present in the adhesive composition in an amount ranging from about 0.5 to about 1.5 weight percent, preferably from about 0.75 to about 0.9 weight percent, based on the total weight of the adhesive composition.

Of the aromatic complex salts which are suitable for use in the compositions of the invention the preferred salts are triaryl-substituted sulfonium salts. The triaryl-substituted salts are preferred because they are generally more thermally stable than the mono- and diaryl substituted salts. The triaryl-substituted complex salts are also more amenable to dye sensitization. Consequently, the use of such complex salts results in compositions which are much more useful in applications where cure is initiated with actinic radiation such as near ultraviolet or visible light. Examples of triaryl-substituted sulfonium complex salt photoinitiators include:

triphenylsulfonium tetrafluoroborate
triphenylsulfonium hexafluorophosphate
triphenylsulfonium hexafluoroantimonate
tritolysulfonium hexafluorophosphate
anisyldiphenylsulfonium hexafluoroantimonate
4-butoxyphenyidiphenylsulfonium tetrafluoroborate
4-chlorophenyidiphenylsulfonium hexafluoroantimonate
4-acetoxy-phenyldiphenylsulfonium tetrafluoroborate
4-acetamidophenyldiphenylsulfonium tetrafluoroborate Of the triaryl-substituted sulfonium complex salts which are suitable for use in the compositions of the invention the most preferred salt is a mixture of triarylsulfonium hexafluoroantimonate salt, commercially available from Union Carbide Corporation under the trade name CYRACURE UVI-6974.

The thermal initiator component of adhesive for adhesive dots 22 is preferably an amine adduct of an epoxy compound. The imidazole component of the thermal initiators may be selected from 2-ethyl-4-methylimidazole, 2-methylimidazole, 2-ethylimidazole, 2-phenylimidazole 1-(-2-hydroxy-3-phenoxypropyl)-2-methylimidazole, 1-(2-hydroxy-3-phenoxypropyl)-2-ethyl-4-methylimidazole, 1-(2-hydroxy-3-butoxpropyl)-2-methylimidazole, 2-mercaptobenzoimidazole and 1-(2-hydroxy-3-butoxypropyl)-2-ethyl-4-methylimidazole. The epoxy component of the thermal initiator may be selected from the group consisting of polyglycidyl ethers, glycidyl ether esters, polyglycidyl esters, glycidylamine compounds, epoxidized phenolic novolac resins, epoxidized cresolnovolac resins, epoxidized polyolefins, butyl glycidyl ethers, phenyl glycidyl ethers and glycidyl methacrylate. Accordingly, the most preferred thermal initiator is available from Ajinomoto Co., Inc. of Tokyo, Japan under the trade name AJICURE MY 24. The amount of thermal initiator in the adhesive preferably ranges from about 5 to about 15 percent by weight, most preferably from about 8 to about 10.5 percent by weight.

The adhesive dots 22 preferably have a viscosity which enables placement of the adhesive on the nozzle plate 12 or semiconductor chip 16 in predetermined locations so that the adhesive dots 22 do not flow and interfere with the flow features of the nozzle plate including the ink flow channel 36 and the ink chamber 38 (FIG. 3). If the viscosity of the adhesive is too high, it may be difficult to apply the proper amount of adhesive is predetermined locations. If the adhesive in the dots 22 has too low a viscosity, it will be difficult for the adhesive to remain in the predetermined location during the assembly until a portion of the adhesive dots 22 is cured. Accordingly, the viscosity of the adhesive preferably ranges from about 40,000 to about 80,000 centipoise at 25° C., most preferably from about 55,000 to about 65,000 centipoise. A HAAKE viscometer VT500 available from Haake USA of Paramus, N.J., having a PK1-1° spindle at a setting speed of one was used to obtain the viscosity of the adhesive.

In order to obtain an adhesive with the preferred viscosity, the adhesive used for adhesive dots 22 preferably contains a viscosity control agent. The preferred viscosity control agent is a silica compound, preferably an amorphous silicon dioxide compound such as fumed silica. Fumed silica may be treated to make it more hydrophilic or more hydrophobic. A particularly preferred viscosity control agent is polyorganosiloxane treated fumed silica such as polydimethylsiloxane treated fumed silica available from Cabot Corporation of Naperville, Ill. under the trade name CAB-O-SIL TS-720.

The adhesive may be made by mixing together the preferred quantities of the components described above in a suitable vessel. For example, all of the components were added to the mix can of a double-planetary mixer. The ingredients were then mixed at room temperature and atmospheric pressure at about 30rpm for about 15 minutes and then the mixer speed was raised to about 60 rpm and the ingredients were mixed under a subatmospheric pressure of about 0.5 mm Hg for about 1 hour. The mixed adhesive formulation was then dispensed into 30 cubic centimeter cartridges. The shelf-life of the resulting adhesive at about −40° C. was about 6 months.

Once the nozzle plate/chip assembly 12/16 is attached to the cartridge body 20, the flexible circuit or TAB circuit 18 is attached to the cartridge body 20 using a heat activated or pressure sensitive adhesive 34. Preferred pressure sensitive adhesives 34 include, but are not limited to phenolic butyral adhesives, acrylic based pressure sensitive adhesives such as AEROSET 1848 available from Ashland Chemicals of Ashland, Ky. and phenolic blend adhesives such as SCOTCH WELD 583 available from 3M Corporation of St. Paul, Minn. The adhesive 34 preferably has a thickness ranging from about 25 to about 200 microns.

In order to control the ejection of ink from the nozzle holes 14, each the semiconductor chip 16 is electrically connected to a print controller in the printer to which the printhead 10 is attached. Connections between the print controller and the resistors 26 of printhead 10 are provided by electrical traces 40 which terminate in contact pads 42 on the semiconductor substrate 16. The contact pads 42 for each trace 40 and resistor 26 are connected to a flexible circuit or TAB circuit 18 as described above. Electrical TAB bond or wire bond connections are made between the flexible circuit or TAB circuit and the contact pads 42 on the semiconductor substrate 16.

By use of an adhesive for adhesive dots 22 as described above, complete cure of the adhesive may be achieved even in areas inaccessible to actinic radiation thereby improving the cross-link density of the cured adhesive which is believed to improve its ink resistance. Accordingly, the formulation and methods described above provide enhanced manufacturing techniques which improve alignment and ink jet pen productivity so that higher quality pens exhibiting longer life may be produced.

Having described various aspects and embodiments of the invention and several advantages thereof, it will be recognized by those of ordinary skills that the invention is susceptible to various modifications, substitutions and revisions within the spirit and scope of the appended claims.

What is claimed is:

1. An adhesive formulation for tacking and holding a nozzle plate in alignment on a semiconductor chip for an ink jet pen of an ink jet printer, the formulation consisting essentially of a multifunctional epoxy material other than a difunctional epoxy material, a difunctional epoxy material, a fumed silica viscosity control agent, an imidazole adduct of an epoxy compound as a thermal initiator and a mixed aryl sulfonium salt photoinitiator.

2. The adhesive formulation of claim 1 wherein the multifunctional epoxy material comprises a polyglycidyl ether of phenol-formaldehyde novolac resin.

3. The adhesive formulation of claim 1 wherein the difunctional epoxy material comprises a bisphenol-A/epichlorohydrin epoxy resin.

4. The adhesive formulation of claim 1 wherein the formulation comprises from about 40 to about 80 percent by weight difunctional epoxy material.

5. The adhesive formulation of claim 4 wherein the formulation comprises from about 15 to about 35 percent by weight multifunctional epoxy material.

6. The adhesive formulation of claim 1 wherein the formulation comprises from about 15 to about 35 percent by weight multifunctional epoxy material.

7. The adhesive formulation of claim 1 wherein the photoinitiator comprises a mixed triarylsulfonium hexafluorophosphate salt.

8. The adhesive formulation of claim 6 wherein the imidazole-epoxy adduct comprises an epoxy adduct selected from the group consisting of 2-ethyl-4-methylimidazole, 2-methylimidazole, 2-ethylimidazole, 2-phenylimidazole 1-(-2-hydroxy-3-phenoxypropyl)-2-methylimidazole, 1-(2-hydroxy-3-phenoxypropyl)-2-ethyl-4-methylimidazole, 1-(2-hydroxy-3-butoxypropyl)-2-methylimidazole, 2-mercaptobenzoimidazole and 1-(2-hydroxy-3-butoxypropyl)-2-ethyl-4-methylimidazole epoxy adducts.

9. The adhesive formulation of claim 8 wherein the epoxy group of the imidazole-epoxy adduct is selected from the group consisting of polyglycidyl ethers, glycidyl ether esters, polyglycidyl esters, glycidylamine compounds, epoxidized phenolic novolac resins, epoxidized cresolnovolac resins, epoxidized polyolefins, butyl glycidyl ethers, phenyl glycidyl ethers and glycidyl methacrylate.

10. The adhesive formulation of claim 1 comprising from about 5 to about 15 percent by weight imidazole-epoxy adduct.

11. The adhesive formulation of claim 1 comprising from about 0.5 to about 1.5 percent by weight mixed aryl sulfonium salt photoinitiator.

12. The adhesive formulation of claim 1 having a viscosity in the range of from about 40,000 to about 80,000 centipoise.

13. A method for making an ink jet pen for an ink jet printer comprising applying dots of a UV and thermally curable adhesive to at least two diagonally opposed corners of a nozzle plate or semiconductor chip, the adhesive including a multifunctional epoxy material other than a difunctionsl epoxy material, a difunctional epoxy material, a fumed silica viscosity control agent, an imidazole adduct of an epoxy compound as a thermal initiator and a mixed aryl sulfonium salt photoinitiator, aligning the nozzle plate and semiconductor chip to one another to provide a nozzle plate/chip assembly, exposing at least a portion of the adhesive dots to actinic radiation in order to cure an amount of the adhesive sufficient to substantially maintain alignment between the nozzle plate and semiconductor chip during subsequent curing and assembly steps, heating the nozzle plate/chip assembly to a temperature sufficient to cure any portion of the adhesive dots not cured by exposure to the actinic radiation, electrically connecting the nozzle plate/chip assembly to a TAB circuit or flexible circuit and attaching the nozzle plate/chip assembly and TAB circuit or flexible circuit to a cartridge body.

14. The method of claim 13 wherein the multifunctional epoxy material comprises a polyglycidyl ether of phenol-formaldehyde novolac resin.

15. The method of claim 13 wherein the difunctional epoxy material comprises a bisphenol-A/epichlorohydrin epoxy resin.

16. The method of claim 13 wherein the adhesive comprises from about 40 to about 80 percent by weight difunctional epoxy material.

17. The method of claim 16 wherein the adhesive comprises from about 15 to about 35 percent by weight multifunctional epoxy material.

18. The method of claim 13 wherein the adhesive comprises from about 15 to about 35 percent by weight multifunctional epoxy material.

19. The method of claim 13 wherein the adhesive has a viscosity ranging from about 40,000 to about 80,000 centipoise.

20. The method of claim 13 wherein the imidazole-epoxy adduct comprises an epoxy adduct selected from the group consisting of 2-ethyl-4-methylimidazole, 2-methylimidazole, 2-ethylimidazole, 2-phenylimidazole 1-(-2-hydroxy-3-phenoxypropyl)-2-methylimidazole, 1-(2-hydroxy-3-phenoxypropyl)-2-ethyl-4-methylimidazole, 1-(2-hydroxy-3-butoxypropyl)-2-methylimidazole, 2-mercaptobenzoimidazole and 1-(2-hydroxy-3-butoxypropyl)-2-ethyl-4-methylimidazole epoxy adducts.

21. The method of claim 20 wherein the epoxy group of the imidazole-epoxy adduct is selected from the group consisting of polyglycidyl ethers, glycidyl ether esters, polyglycidyl esters, glycidylamine compounds, epoxidized phenolic novolac resins, epoxidized cresolnovolac resins, epoxidized polyolefins, butyl glycidyl ethers, phenyl glycidyl ethers and glycidyl methacrylate.

22. A pen for an ink jet printer which comprises a cartridge body containing one or more printheads attached thereto, each printhead including a nozzle plate, a semiconductor chip attached to the nozzle plate, a flexible circuit or TAB circuit attached to the semiconductor chip, the flexible circuit or TAB circuit containing electrical traces and electrical connections from the traces to semiconductor chip and dots of a UV and thermally curable adhesive for tacking the nozzle plate and the semiconductor chip to one another, the adhesive containing a multifunctional epoxy material other than a difunctional epoxy material, a difunctional epoxy material, a fumed silica viscosity control agent, an imidazole adduct of an epoxy compound as a thermal initiator and a mixed aryl sulfonium salt photoinitiator.

23. The pen of claim 22 further comprising an ink cartridge containing ink removably attached to the cartridge body.

24. The pen of claim 22 wherein the multifunctional epoxy material comprises a polyglycidyl ether of phenol-formaldehyde novolac resin.

25. The pen of claim 22 wherein the difunctional epoxy material comprises a bisphenol-A/epichlorohydrin epoxy resin.

26. The pen of claim 22 wherein the adhesive comprises from about 40 to about 80 percent by weight difunctional epoxy material.

27. The pen of claim 26 wherein the adhesive comprises from about 15 to about 35 percent by weight multifunctional epoxy material.

28. The pen of claim 27 wherein the photoinitiator comprises a mixed triarylsulfonium hexafluorophosphate salt.

29. The pen of claim 22 wherein the imidazole-epoxy adduct comprises an epoxy adduct selected from the group consisting of 2-ethyl-4-methylimidazole, 2-methylimidazole, 2-ethylimidazole, 2-phenylimidazole 1-(-2-hydroxy-3-phenoxypropyl)-2-methylimidazole, 1-(2-hydroxy-3-phenoxypropyl)-2-ethyl-4-methylimidazole, 1-(2-hydroxy-3-butoxypropyl)-2-methylimidazole, 2-mercaptobenzoimidazole and 1-(2-hydroxy-3-butoxypropyl)-2-ethyl-4-methylimidazole epoxy adducts.

30. The pen of claim 29 wherein the epoxy group of the imidazole-epoxy adduct is selected from the group consisting of polyglycidyl ethers, glycidyl ether esters, polyglycidyl esters, glycidylamine compounds, epoxidized phenolic novolac resins, epoxidized cresolnovolac resins, epoxidized polyolefins, butyl glycidyl ethers, phenyl glycidyl ethers and glycidyl methacrylate.

31. The pen of claim 22 wherein the adhesive comprises from about 5 to about 15 percent by weight imidazole-epoxy adduct and from about 0.5 to about 1.5 percent by weight mixed aryl sulfonium salt photoinitiator and has a viscosity in the range of from about 40,000 to about 80,000 centipoise.

* * * * *